(12) United States Patent  
Rioufol et al.

(10) Patent No.: US 8,316,704 B2  
(45) Date of Patent: Nov. 27, 2012

(54) DOWNHOLE ANNULAR MEASUREMENT SYSTEM AND METHOD

(75) Inventors: Emmanuel Rioufol, Houston, TX (US); Yasser El-Khazindar, Dokki (EG)

(73) Assignee: Schlumberger Technology Corporation, Sugar Land, TX (US)

( * ) Notice: Subject to any disclaimer, the term of this patent is extended or adjusted under 35 U.S.C. 154(b) by 458 days.

(21) Appl. No.: 12/571,388

(22) Filed: Sep. 30, 2009

(65) Prior Publication Data

US 2010/0089141 A1 Apr. 15, 2010

Related U.S. Application Data

(60) Provisional application No. 61/105,075, filed on Oct. 14, 2008.

(51) Int. Cl.  
*E21B 47/10* (2012.01)
(52) U.S. Cl. .................................... 73/152.36
(58) Field of Classification Search ............... 73/152.18, 73/152.29–152.36  
See application file for complete search history.

(56) References Cited

U.S. PATENT DOCUMENTS

| | | | | |
|---|---|---|---|---|
| 2,842,961 | A * | 7/1958 | Doll ........................... | 73/152.34 |
| 2,932,740 | A * | 4/1960 | Widmyer ..................... | 250/268 |
| 3,176,511 | A | 4/1965 | Widmyer | |
| 3,530,711 | A * | 9/1970 | Tocanne ...................... | 73/152.23 |
| 4,441,361 | A * | 4/1984 | Carlson et al. ............... | 73/152.31 |
| 4,487,261 | A * | 12/1984 | Gazda ........................... | 166/264 |
| 4,974,452 | A * | 12/1990 | Hunt et al. .................... | 73/861.64 |
| 5,052,220 | A * | 10/1991 | Piers ........................... | 73/152.36 |
| 5,375,465 | A * | 12/1994 | Carlson ....................... | 73/152.05 |
| 5,831,177 | A | 11/1998 | Waid | |
| 5,861,562 | A * | 1/1999 | Pringle et al. .............. | 73/861.63 |
| 6,240,787 | B1 * | 6/2001 | Alexander ................... | 73/861.49 |
| 6,360,820 | B1 | 3/2002 | Laborde | |
| 6,612,187 | B1 | 9/2003 | Lund | |
| 6,618,677 | B1 * | 9/2003 | Brown .......................... | 702/13 |
| 6,629,564 | B1 | 10/2003 | Ramakrishnan | |
| 6,755,247 | B2 | 6/2004 | Moake | |
| 6,860,325 | B2 * | 3/2005 | Ramakrishnan et al. ....... | 166/66 |
| 7,140,434 | B2 | 11/2006 | Chouzenoux | |
| 7,397,388 | B2 | 7/2008 | Huang | |
| 7,520,324 | B2 | 4/2009 | Chen | |
| 7,658,226 | B2 * | 2/2010 | Ziauddin et al. ......... | 166/250.01 |
| 7,827,859 | B2 * | 11/2010 | Pipchuk et al. ............ | 73/152.18 |
| 2003/0085185 | A1 | 5/2003 | Kouba | |
| 2003/0164049 | A1 * | 9/2003 | Oddie et al. ................ | 73/861.52 |
| 2004/0035577 | A1 * | 2/2004 | Ramakrishnan et al. | 166/250.07 |
| 2004/0173016 | A1 * | 9/2004 | Fayeulle et al. ............ | 73/152.31 |
| 2006/0016593 | A1 | 1/2006 | Gambier | |

(Continued)

*Primary Examiner* — John Fitzgerald  
(74) *Attorney, Agent, or Firm* — Brandon S. Clark; Rodney V. Warfford

(57) ABSTRACT

A downhole measurement system may comprise an optional fluid inlet section configured to accommodate fluid flow between a well and a zone surrounding the well. The system may further comprise a flow conditioning section configured to receive the fluid from the fluid inlet section. The flow conditioning section may be configured to produce a substantially homogenized fluid flow. In addition, a measuring section may be provided and configured to measure at least a portion of the fluid flow from the flow conditioning section. The measuring section characterizes a parameter of the fluid flow. In other embodiments, there may be a method for characterizing a parameter of a fluid flow comprising the steps of directing the fluid flow to a flow conditioning section. Other steps may be conditioning the fluid flow to a substantially homogeneous state and measuring a parameter for at least a portion of the fluid flow.

21 Claims, 5 Drawing Sheets

U.S. PATENT DOCUMENTS

\* cited by examiner

2006/0131014 A1 6/2006 Huang
2008/0134775 A1\* 6/2008 Pipchuk et al. ............ 73/152.18
2009/0025923 A1 1/2009 Patel

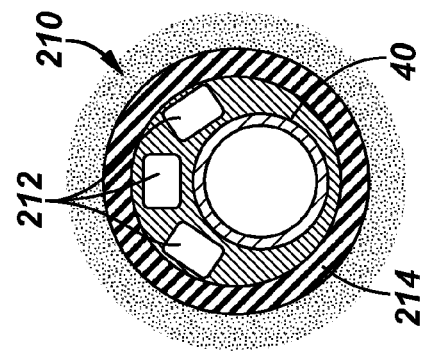
FIG. 3
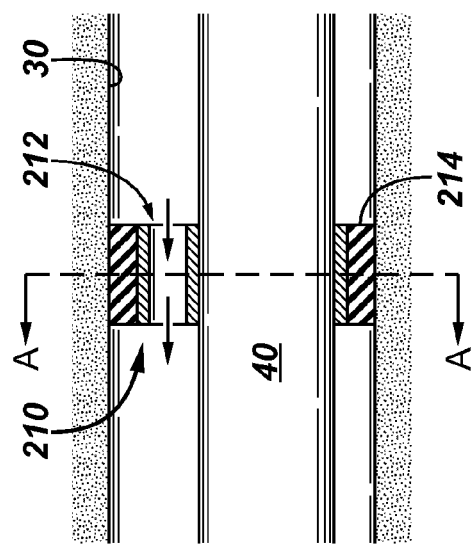
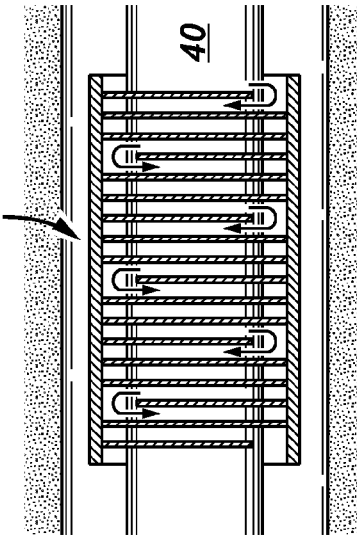
FIG. 4B
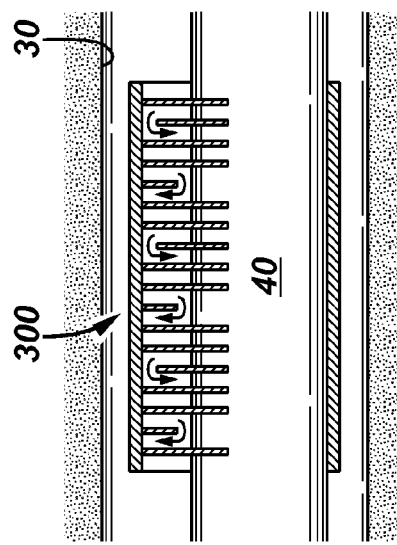
FIG. 4A

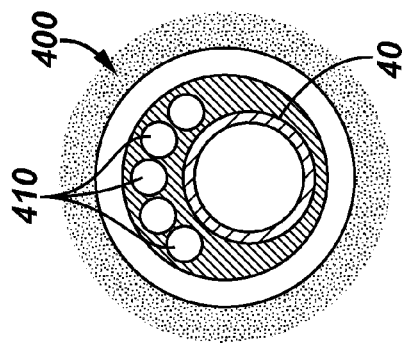
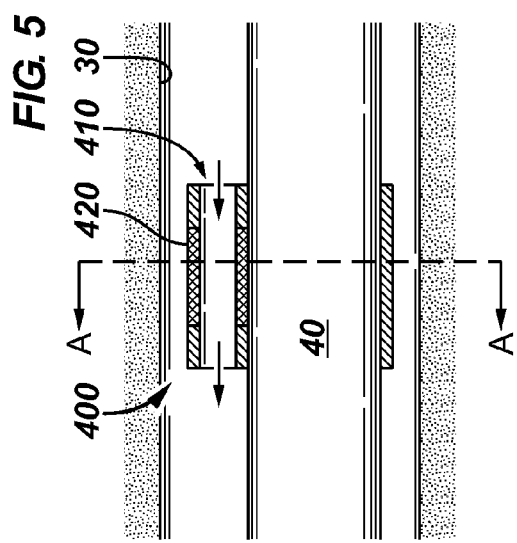
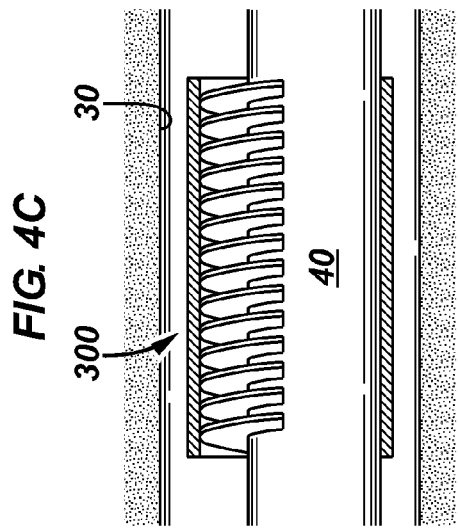
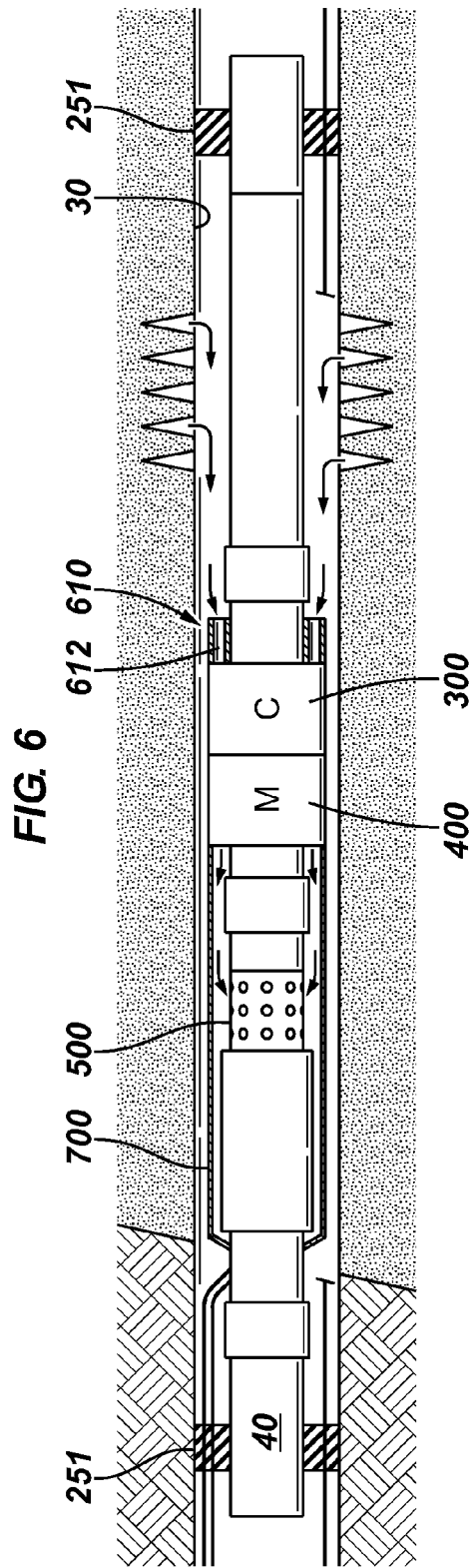

DOWNHOLE ANNULAR MEASUREMENT SYSTEM AND METHOD

RELATED APPLICATIONS

This application claims the benefit of U.S. Provisional Application No. 61/105,075, filed Oct. 14, 2008, the contents of which are herein incorporated by reference.

BACKGROUND

1. Field of the Invention

Embodiments of the claimed invention may relate generally to the characterization of fluid flow in downhole applications, and more particularly to downhole annular measurement systems. However, embodiments may not be limited to these fields and applications of aspects of the various concepts recited herein may be applied to other related and unrelated fields.

2. Description of the Related Art

The following descriptions and examples are not admitted to be prior art by virtue of their inclusion in this section.

Hydrocarbon fluids such as oil and natural gas are obtained from a subterranean geologic formation, referred to as a reservoir, by drilling a well that penetrates the hydrocarbon-bearing formation. However, measurement of fluid either produced from the well or injected into the well can present problems for accurately determining the flow of fluid through the well without significantly impeding access through the main production tubing bore. In addition, precise measurement of the individual contributions of various zones in a multi-zone well or various branches in a multi-lateral well can also be difficult, but important in determining the balance and productivity of the well system.

Therefore, one purpose among many proposed for various embodiments described herein is to configure a downhole annular measurement system adapted to characterize parameters of the fluids produced from or injected into a given zone. The measurement may be done without any restriction in the main bore, accordingly leaving full bore access in the tubing. Various embodiments may be more particularly designed for multi-zone Intelligent Completion (IC) systems but the concepts are applicable to single zone wells.

An illustrative result of the measurements provided by some of the embodiments of the downhole system may be to characterize the flow contribution from each zone in a producer well. Characterization may include measuring the flow rate and possibly identifying the proportion and physical properties of the different phases of the constituent fluid (e.g., such as oil, water and gas), prior to the fluid joining the main bore production. Alternatively, in an injector well, an illustrative result may be to measure the quantity of fluid separated out from the main bore and injected into a given zone.

In order to characterize the production of a multi-zone completion, downhole measurement devices, such as a flowmeter system, may be installed in each producing/injecting zone. The downhole system may be integrated to the rest of the completion string and is installed along with the completion.

SUMMARY

In accordance with one embodiment of a downhole measurement system, a downhole system may comprise a flow conditioning section configured to produce a substantially homogenized mixture of a fluid flow. At least a portion of the fluid flow may enter into a measuring section configured to measure the fluid flow portion. The measuring section may characterize a parameter of the fluid flow. In some embodiments, the flow conditioning section may include a labyrinth flow pathway.

In another embodiment of a downhole measurement system, a method for characterizing a parameter of a fluid flow may comprise directing the fluid flow to a flow conditioning section and conditioning the fluid flow to a substantially homogenized state. The method may further include measuring the parameter for at least a portion of the fluid flow. The measured parameter may be used to characterize the fluid flow.

Other or alternative features will become apparent from the following description, from the drawings, and from the claims.

BRIEF DESCRIPTION OF THE DRAWINGS

Certain embodiments of the invention will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows:

FIG. 3 is a schematic illustration and cross-sectional view of a fluid inlet section according to an embodiment of a downhole measurement system;

FIGS. 4A & 4B are side and top schematic illustrations of a flow conditioning section including a labyrinth flow path according to an embodiment of a downhole measurement system;

FIG. 4C is a side schematic illustration of a flow conditioning section including a spiral flow path according to an embodiment of a downhole measurement system;

FIG. 5 is a schematic illustration and cross-sectional view of a measuring section according to an embodiment of a downhole measurement system;

FIG. 6 is a schematic illustration and partial cross-sectional representation of a zone of a completion according to an embodiment of a downhole measurement system.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

In the specification and appended claims: the terms "connect", "connection", "connected", "in connection with", and "connecting" are used to mean "in direct connection with" or "in connection with via another element"; and the term "set" is used to mean "one element" or "more than one element". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the invention.

Figure 1:
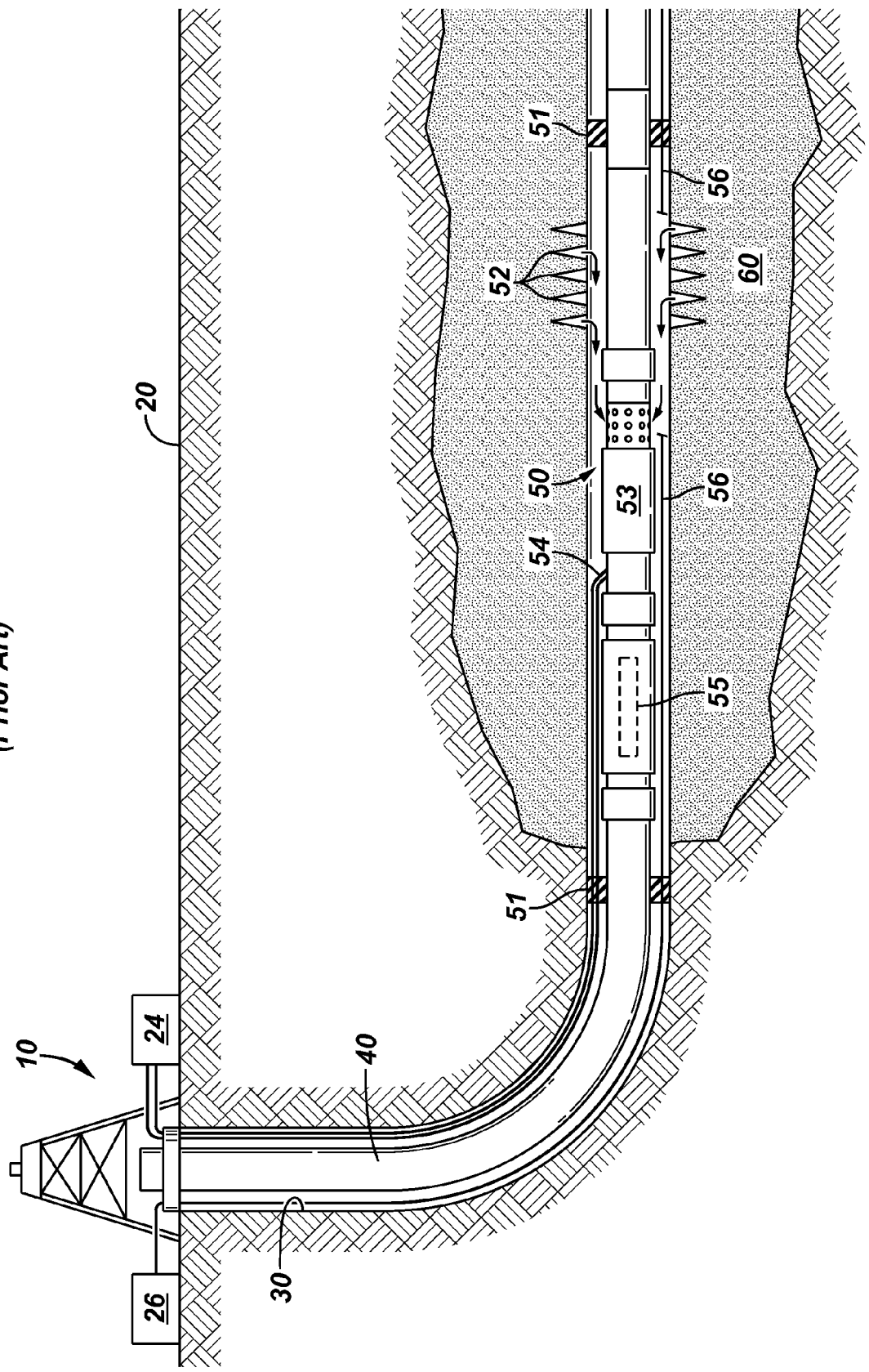
FIG. 1 is a schematic illustration of a prior art intelligent completion zone of a well system.

Referring generally to FIG. 1, in a multiple zone intelligent (or selective) completion, a well system 10 may be drilled through the surface 20 to create a wellbore 30. The wellbore 30 may be lined with casing or unlined (not shown). Within the wellbore 30, a completion comprising production tubing 40 and a completion zone system 50 may run to access a fluid reservoir 60. The completion zone system 50 may comprise one or more packers 51 sealing the completion zone system 50 to the interior of the wellbore 30.

Access to the reservoir 60 may be provided via perforations 52 in the casing of the wellbore 30. As shown by the arrows in the figure, desired fluid, such as hydrocarbon fluid for example, may enter the annulus between the completion zone system 50 and the interior wall of the wellbore 30. The fluid may further flow to the interior of the production tubing 40 via a flow control valve 53 such as an inflow control device. The flow control valve 53 may be hydraulically controlled via control lines 54 and a hydraulic surface system 24, for example. Once inside the production tubing 40, the pressure may be measured with a gauge mandrel 55 and the results communicated with the surface via a communications line 56 and a surface communication system 26.

Figure 2:
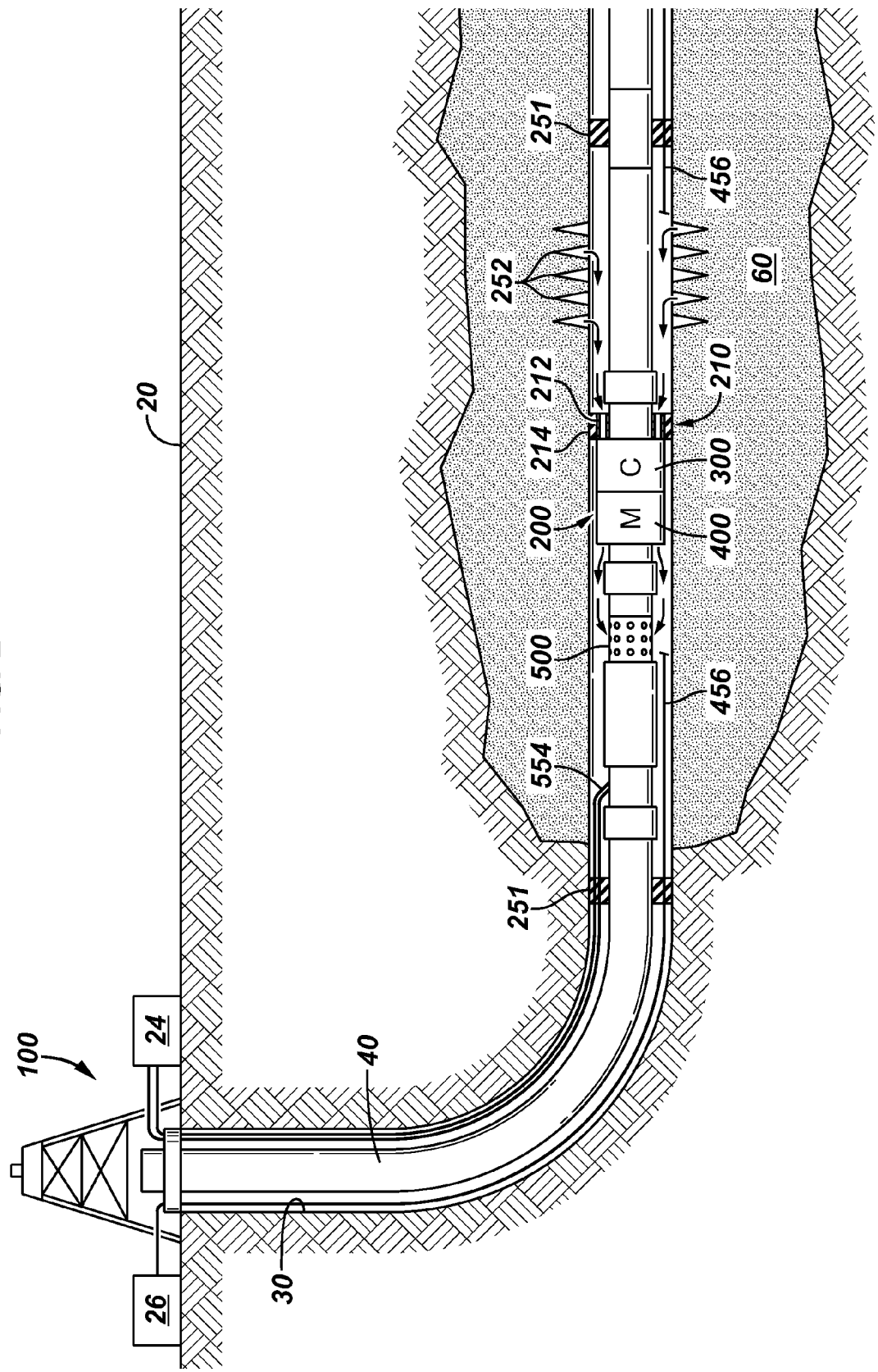
FIG. 2 is a schematic illustration and partial cross-sectional representations of a zone of a completion according to an embodiment of a downhole measurement system.

Turning generally to FIG. 2, an illustrative embodiment of a downhole measurement system 200 is shown. This downhole measurement system 200 may replace or can be used in conjunction with the downhole gauge mandrel 55 (see FIG. 1). The downhole measurement system 200 may be installed between the flow control valve 500 and the producing/injecting zone 60, accessed via perforations 252. The portion of flow that is measured is the one produced/injected from/to the corresponding zone 60.

As shown in FIG. 2, this drawing represents an example of a producer version of an embodiment of the downhole measurement system 200. In some embodiments, the downhole measurement system 200 may be composed of three subassembly sections, a fluid inlet section 210, a flow conditioning section 300, and a measuring section 400, as described below. The descriptions follow from right to left as viewed in the figure. The downhole measuring system 200 may be provided upstream of a flow control valve 500 actuated by hydraulic control lines 554. In addition, the reservoir zone 60 may be segmented in the wellbore 30 via a zone sectioning device, such as one or more isolation packers 251, sealing the annulus located between the exterior of the production tubing 40 and an interior surface of the wellbore 30. In some cases, a series of downhole measurement systems 200 may be provided in a string in which the upstream packer 251 of one downhole measurement system 200 is the downstream packer 251 of an adjacent downhole measurement system 200. In this case, the zone sectioning device would only use a single packer 251 per downhole measurement system 200.

In a production system, the first section of the downhole measurement system 200 may be the fluid inlet section 210. The fluid inlet section 210 is optional and may be integral to the flow conditioning section 300. As shown in this illustrative embodiment and more readily seen in FIG. 3, the fluid inlet section 210 may comprise an optional fluid barrier 214 and one or more inlet passageways 212 (three are shown in this example).

The optional fluid barrier 214 may be configured to prevent any portion of the produced fluids from by-passing the rest of the downhole measurement system 200. This fluid barrier 214 may be a classical packer with or without slips, with a compressed element, or a cup, for example. This fluid barrier 214 may also be achieved with a swellable packer, among other components. In some embodiments, the fluid barrier 214 may be replaced by a shroud (described later) or even be completely removed if it is determined that the amount of fluid by passing the downhole measurement system 200 is negligible with regard to the precision required.

The fluid inlet section 210 may direct the fluid produced from the reservoir 60 via the perforations 252 into flow conditioning section 300. As more readily seen in FIG. 4, the flow conditioning section 300 may function to mix the produced fluids (e.g., oil, water and gas) into a substantially macroscopically homogenous mixture. Mixing the fluids may be performed in order to reduce or remove the slippage that may occur between phases (i.e., differences of speed or velocity) and thereby ease the measurement in the measuring section.

Among other functions, the flow conditioning section 300 may also be configured to diffuse this mixture to the next section of the downhole measurement system 200 at a speed that is substantially equal to the speed of fluid flowing into the zone. The resultant homogenous flow allows the next section to be configured so as to take a representative "sample" in order to characterize the overall flow measurements. Various design principles may be incorporated into the flow conditioning section 300 in order to achieve a substantially homogenized fluid flow.

For example, one of the design principles used in some cases for achieving a diffuse, homogenous flow is a 3D labyrinth fluid pathway, such as that shown in the side and top views of FIGS. 4A and 4B. The flow trajectory may be forced in as many as 4 different directions while traversing the fluid pathway, for example. The direction changes cause the fastest phase (i.e., gas) to interfere with the slowest ones (i.e., oil and water) multiple times. The number of direction changes, the flowing section area, and the length of the conditioning sub, should be dimensioned in order to produce a homogenous mixture independent of the initial azimuthal orientation of the tool in the well and the flow regime entering in the tool (e.g. laminated). In non-modified flow regimes, the fastest phases such as gas may rise to an uppermost portion of a horizontal wellbore, resulting in a velocity differential across the area of the flow tube.

Alternatively, other designs, such as spirals (shown in FIG. 4C) for example, can be used for the flow conditioning section 300 and adapted to the expected conditions, such as the type of flow and the number of phases. If permitted by the expected flowing conditions (e.g. homogenized) and the type of characterization required, the flow conditioning section 300 could also be considered as optional with regard to the overall downhole measurement system 200 (see FIG. 2). For example, injection wells typically have homogenized fluid flows and would accordingly not require a flow conditioning section 300, among others.

Turning now to FIG. 5, this drawing generally illustrates the measuring section 400 of the downhole measurement system 200 (see FIG. 2). This section may be composed of one or more flow channels 410 (four are shown in this example). The measurements used to characterize the overall zone contribution may be made in at least one of the flow channels 410. Sensors 420 may be incorporated in at least one of the flow channels 410 in order to perform the various measurements required to characterize the fluid flow contribution from the corresponding zone. Due at least in part to the flow conditioning section 300 providing a homogenized fluid flow to the measuring section 400, a representative sample of the fluid flow can be measured in at least one of the flow channels 410 and the results processed to characterize the total fluid flow.

Measuring just a sample/part of the overall fluid flow via one or more sensors 420 may be considered as a valid method when the mixture flowing in that flow channel 410 is representative of the overall zone fluid flow contribution. In some cases, the total production rate of the overall zone may be simply determined by multiplying the results of the measured or sampled flow channel 410 by the total number of flow channels 410, or normalized using the proportional area of the sample flow channel(s) 410 relative to the overall flow area. Of course, alternatively, such as for redundancy purposes, the measurements can be made in more than one or even all the channels.

In some embodiments, flow characterization may comprise the measuring of the total mass flow. The flow characterization can then be complemented by other measurements in order to determine the fraction and the physical properties of each phase present in the fluid flow.

This characterization may be achieved with a combination of sensors 420 integrated in the measuring flow channel(s) 410. Sensors 420 may comprise, but are not limited to the following parameters and exemplary configurations:

Mass flow rate: Venturi or plate profile with 2 absolute pressure gauges or a pressure delta sensor Volume flow rate Speed of the flow: Doppler sensor, acoustic sensor, thermal anometer, spinner Water Cut: Capacitive and Resistive sensor, acoustic sensor Density: Gamma ray detector and source Viscosity: Piezoelectric Temperature sensors Radioactive tracer detector Turning again to FIG. 2, once the fluid exits the downhole measurement system 200, the fluid flow may flow through a flow control valve 500 before entering into the main production tubing 40. In the main production tubing 40, the fluid flow from the reservoir zone 60 may be combined with other fluids produced by the zones from previous sections of the well.

For an injector wells, the downhole measurement system 200 may be inverted in order to measure the flow coming out from the flow control valve 500. The function of the flow conditioning section 300 may be simplified since a single phase of fluid is typically injected (e.g., such as water or gas) and therefore, there is no need for mixing to produce a homogenized fluid flow. In such cases, the flow conditioning section 300 may simply ensure a substantially homogenous fluid flow prior to entering into the fluid measuring section 400.

Use of some embodiments of the downhole measurement system 200 may allow for full bore access in the main production tubing 40. When compared to a venturi type of flowmeter, some embodiments of the downhole measurement system 200 simplify intervention by eliminating an extra trip downhole to remove and reinstall a venturi lock. Reduced need for intervention may result in operational cost saving, reduced production deferment and overall reduced risks. In addition, full bore access reduces the risk of debris accumulation in front of restrictions (such as may be present with venturi types of flowmeters) in horizontal wells. Embodiments of the downhole measurement system 200 may be installed in each producing/injecting zone with a relatively minimal impact on the completion design and well inflow performances.

The use of some embodiments of a downhole measurement system 200 incorporating sampling of the total fluid flow may allow for a reduction in the size of sensors 420 (see FIG. 5).

The sensors 420 themselves may be adapted specifically to the size of the measuring flow channels 410. Sensor miniaturization may reduce the cost of packaging and help to drive the overall system cost down. The same size of measurement flow channel 410 may be used from one main production tubing size 40 to another. The cost of engineering and development time for implementation to other tubing sizes may be reduced. In addition, an increased number of common parts between downhole measurement systems 200 configured for various sizes of production tubing 40 may simplify the overall manufacturing process, ease inventory, and reduce the overall lead time and manufacturing costs.

Referring now to FIG. 6, this drawing generally shows another exemplary embodiment of a downhole measurement system 600. In this illustrative embodiment, the optional fluid inlet section 610 does not have a separate barrier system to seal with the interior surface of the wellbore 30. Instead, the fluid inlet section 610 comprises one or more inlet passageways 612 (two passageways can be seen in this view). However, in order to keep fluid that may flow around the outer circumference of the fluid inlet section 610 and enter into the flow control valve 500 without being accounted for by the fluid measuring section 400, a shroud 700 may be placed around the flow control valve 500 to limit access to the interior of the main production tubing 40.

The shroud 700 may direct fluid flow exiting from the flow conditioning section 300 and the fluid measuring section 400 into the flow control valve 500. In addition, the shroud 700 may restrict fluid in the annulus around the downhole measurement system 600 from entering into the main production tubing 40. The shroud 700 may reduce the complexity and cost of the overall downhole measurement system 600 by eliminating a fluid barrier from the fluid inlet system 610 and any sealing requirements associated there with.

Figure 7:
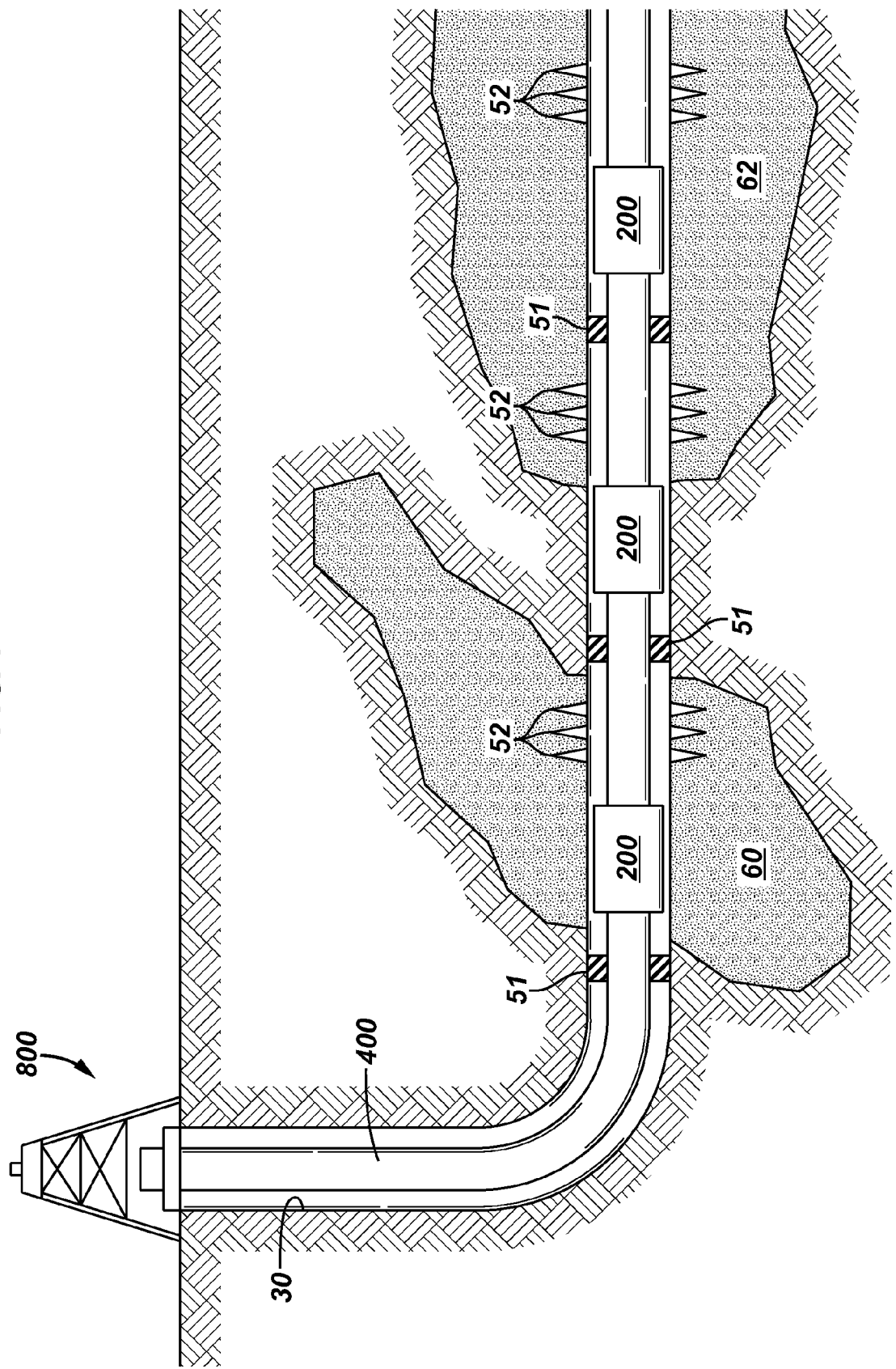
FIG. 7 is a schematic illustration of a multi-zone well system according to an embodiment of a downhole measurement system.

Turning now to FIG. 7, another illustrative embodiment of a well system 800 incorporating downhole measurement systems 200 is shown in this drawing. In this situation, two reservoirs 60 and 62 are shown interacting with three downhole measurement systems 200. In some cases, the use of different downhole measurement systems 200 from individual reservoirs 60 and 62 can be used to determine the contribution of each reservoir 60 and 62 to the overall production of the well system 800. In other cases, the use of more than one downhole measurement systems 200 in a single reservoir 62 can allow for a more efficient and effective management of the reserves located within that reservoir 62. For example, if one of the downhole measurement systems 200 detects an increase in water cut or other evidence of water breakthrough, the impacted downhole measurement system 200 may be shut down while production continues with the non-impacted downhole measurement system 200.

Although single and multi-zone well systems have been shown with horizontal, terrestrial wells, embodiments of downhole measurement systems may not be limited to this application. Both production and injector wells, sub-sea and terrestrial wells, and vertical, horizontal, deviated, and multilateral wells may be suitable to apply aspects of embodiments of downhole measurement systems described herein.

While the downhole measurement system has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the invention.

What is claimed is:

1. A system for completing one or more zones of a well, wherein each of the zones comprises:
    a zone sectioning device comprising at least one packer;
    a flow conditioning section configured to produce a substantially macroscopically homogenous fluid flow;
    a measuring section configured to measure a least a portion of the fluid flow from the conditioning section;
    a inflow control device configured to provide access between an interior of a well tubing and a reservoir; and
    a shroud configured to direct the fluid flow to the inflow control device;
    wherein the measuring section characterizes a parameter of the fluid flow.

2. The system recited in claim 1 wherein the zone sectioning device comprises two packers.

3. The system recited in claim 1, wherein the measuring section is configured to characterize two or more parameters of the fluid flow.

4. The system recited in claim 1, wherein the parameter of the fluid flow is at least one of mass flow rate, volume flow rate, speed of flow, temperature, viscosity, density, water cut, or pressure.

5. The system recited in claim 1, wherein the conditioning section comprises a labyrinth flow path.

6. The system recited in claim 1, wherein the measuring section samples substantially all of the fluid flow.

7. A method for characterizing a parameter of a fluid flow comprising:
    directing the fluid flow to a flow conditioning section;
    conditioning the fluid flow to a substantially homogenized state;
    measuring the parameter for at least a portion of the fluid flow; and
    directing the fluid flow, with a shroud, to an inflow control device configured to provide access between an interior of a well tubing and a reservoir;
    wherein the measured parameter is used to characterize the fluid flow; and
    wherein the fluid flow and the flow conditioning section are disposed in a downhole zone of a well.

8. The method recited in claim 7, wherein the parameter is measured for substantially all of the fluid flow.

9. The method recited in claim 7, wherein a labyrinth flow path is provided for conditioning the fluid flow.

10. The method recited in claim 7, further comprising communicating the measured parameter to another location.

11. A system for completing one or more zones of a well, wherein each of the zones comprises:
    a zone sectioning device comprising at least one packer;
    a flow conditioning section configured to produce a substantially macroscopically homogenous fluid flow;
    a measuring section configured to measure a least a portion of the fluid flow from the conditioning section;
    a inflow control device configured to provide access between an interior of a well tubing and a reservoir; and
    a fluid inlet section configured to direct the fluid flow into the flow conditioning section;
    wherein the fluid inlet section is further coupled to a packer used to inhibit the fluid flow from flowing past an external circumference of the fluid inlet section;
    wherein the measuring section characterizes a parameter of the fluid flow.

12. The system recited in claim 11, wherein the zone sectioning device comprises two packers.

13. The system recited in claim 11, further comprising a shroud directing the fluid flow to the inflow control device.

14. The system recited in claim 11, wherein the measuring section is configured to characterize two or more parameters of the fluid flow.

15. The system recited in claim 11, wherein the parameter of the fluid flow is at least one of mass flow rate, volume flow rate, speed of flow, temperature, viscosity, density, water cut, or pressure.

16. The system recited in claim 11, wherein the conditioning section comprises a labyrinth flow path.

17. The system recited in claim 11, wherein the measuring section samples substantially all of the fluid flow.

18. A method for characterizing a parameter of a fluid flow comprising:
    directing the fluid flow, through a fluid inlet section, to a flow conditioning section;
    conditioning the fluid flow to a substantially homogenized state; and
    measuring the parameter for at least a portion of the fluid flow;
    wherein the measured parameter is used to characterize the fluid flow;
    wherein the fluid flow and the flow conditioning section are disposed in a downhole zone of a well; and
    wherein the fluid inlet section is further coupled to a packer used to inhibit the fluid flow from flowing past an external circumference of the fluid inlet section.

19. The method recited in claim 18, wherein the parameter is measured for substantially all of the fluid flow.

20. The method recited in claim 18, wherein a labyrinth flow path is provided for conditioning the fluid flow.

21. The method recited in claim 18, further comprising communicating the measured parameter to another location.

* * * * *